United States Patent
Kadakia et al.

(10) Patent No.: US 9,210,225 B2
(45) Date of Patent: Dec. 8, 2015

(54) METHOD AND SYSTEM FOR DYNAMICALLY ASSIGNING A SERVER

(75) Inventors: Nirav Kadakia, Parlin, NJ (US);
Andrew Bucko, Old Bridge, NJ (US);
Stephen Vansaders, Manalapan, NJ (US); Nilesh Shah, Monmouth Junction, NJ (US)

(73) Assignee: Vonage Network LLC, Holmdel, NJ (US)

( * ) Notice: Subject to any disclaimer, the term of this patent is extended or adjusted under 35 U.S.C. 154(b) by 472 days.

(21) Appl. No.: 13/478,630

(22) Filed: May 23, 2012

(65) Prior Publication Data

US 2013/0107752 A1   May 2, 2013

Related U.S. Application Data

(60) Provisional application No. 61/554,210, filed on Nov. 1, 2011.

(51) Int. Cl.
| | |
|---|---|
| *H04L 12/28* | (2006.01) |
| *H04L 29/08* | (2006.01) |
| *H04L 29/06* | (2006.01) |
| *H04W 48/04* | (2009.01) |
| *H04W 48/00* | (2009.01) |

(52) U.S. Cl.
CPC ............ *H04L 67/18* (2013.01); *H04L 65/1073* (2013.01); *H04W 48/04* (2013.01); *H04W 48/17* (2013.01)

(58) Field of Classification Search
USPC ............................................ 370/310–395.54
See application file for complete search history.

(56) References Cited

U.S. PATENT DOCUMENTS

| | | | |
|---|---|---|---|
| 7,221,939 B2 | 5/2007 | Ylitalo et al. | |
| 7,379,455 B2 | 5/2008 | Pickett | |
| 7,843,903 B2 * | 11/2010 | Bakke et al. | 370/354 |
| 7,894,807 B1 * | 2/2011 | Drennan | 455/417 |
| 8,064,580 B1 | 11/2011 | Apple et al. | |
| 8,064,875 B2 * | 11/2011 | Velazquez et al. | 455/404.2 |
| 8,189,568 B2 * | 5/2012 | Qiu et al. | 370/352 |
| 8,190,148 B1 * | 5/2012 | Ezrol et al. | 455/432.1 |
| 2003/0217122 A1 * | 11/2003 | Roese et al. | 709/219 |
| 2005/0147058 A1 * | 7/2005 | Tarnanen et al. | 370/310 |
| 2007/0097956 A1 | 5/2007 | Okmianski et al. | |
| 2008/0025294 A1 | 1/2008 | Elliott | |

(Continued)

OTHER PUBLICATIONS

International Searching Authority, International Search Report mailed Aug. 24, 2012, 1 page.

*Primary Examiner* — Kwang B Yao
*Assistant Examiner* — Juvena Loo
(74) *Attorney, Agent, or Firm* — Duane Morris LLP; Joseph Pagnotta (57) ABSTRACT

A method of dynamic server assignment in a VoIP network includes detecting a telecommunication device on the VoIP network and querying a geo-location server for geographic information related to the telecommunication device's location and receiving the geographic information. Based on the geographic information a server assignment is determined. A configuration file for the telecommunication device including the server assignment and location is created and the configuration is provided to the telecommunication device over the network. The configuration file may also include features related to local customs or practice.

19 Claims, 5 Drawing Sheets

(56) References Cited

U.S. PATENT DOCUMENTS

| | | | |
|---|---|---|---|
| 2010/0023603 A1* | 1/2010 | Archer et al. | 709/220 |
| 2010/0172345 A1* | 7/2010 | Bjorsell et al. | 370/352 |
| 2010/0173620 A1 | 7/2010 | Hicks, III | |
| 2010/0233991 A1* | 9/2010 | Crawford et al. | 455/404.1 |
| 2010/0241748 A1 | 9/2010 | Ansari et al. | |
| 2010/0274672 A1* | 10/2010 | Patel | 705/14.66 |
| 2011/0081884 A1 | 4/2011 | Sennett et al. | |
| 2011/0222471 A1* | 9/2011 | Abraham et al. | 370/328 |

\* cited by examiner

METHOD AND SYSTEM FOR DYNAMICALLY ASSIGNING A SERVER

BACKGROUND

Description of VoIP

In current VoIP systems when a user connects their IP telephony device to a broadband network access point, the device initiates communication with a configuration server of the VoIP system. As a result of this action, the device is assigned to a proxy server or proxy group of servers that enables communication set up. Currently, this assignment to a proxy server or proxy group of servers is a static assignment predetermined prior to activation of the device. In addition, current systems keep this assignment without respect to changes in network topology or changes to the location of the device.

One prior art configuration assignment method is described in US 2007/0097956 which selects a configuration service, the selection of a configuration is based on a selected service provider. Another prior art method, US 2011/0081884, describes the use of a visiting location register ("VLR") containing information regarding call control and provisioning associated with each subscriber within a geographic area. Yet another prior art method is described in U.S. Pat. No. 7,221,939 which is directed to a mobile devices that stores location identifiers and associated linked profiles.

Unlike the prior art, the current disclosure describes dynamically assigning a proxy server or proxy group of servers based on geographic or network proximity between the proxy server or proxy group and the device. This dynamic assignment may be additionally based on reliability, speed or capacity of those proxy groups within comparable geographic proximity of the device. The assignment of the closest proxy server or proxy group enables higher quality, speed and reliability of the signaling required in setting up the communication. In addition, this dynamic assignment may also improve the quality and reliability of the communication as well, to the extent relays and gateways are associated with the local proxy groups, and may also be proximate to the device. The benefit is maintenance of high call quality as service areas expand caused in part by device migration and in part by smart phones accessing Wi-Fi hotspots or cellular networks in various locations worldwide. With proxy group assignments closest to the customer results in a reduced likelihood of SIP signaling or other communication signaling failure between the device and the network.

The dynamic geographic based assignment of proxy groups allows for the growth of network systems and the redistribution of users of the network resource to local or more proximate network resources as these new resources are added to the network.

As a result of the dynamic assignment of local proxy groups, a variety of features may also be more easily implements then could be in the prior art static pre-assignments. Such features include 911 emergency calls, call features such as ring tone, busy signals, and language being tailored to the culture or distinctness of local geographic area.

These and many other objects and advantages of the present subject matter will be readily apparent to one skilled in the art to which the invention pertains from a perusal of the claims, the appended drawings, and the following detailed description of preferred embodiments.

DETAILED DESCRIPTION

A VoIP device operated by the user, may include a standard telephone in operation with a terminal adaptor, a smart phone running a VoIP application, a computer running a soft phone application, or any other device used to make calls over a VoIP network that converts digital voice to analog voice and vice versa. The VoIP device upon activation typically first registers with network through a configuration server. The configuration server queries a central database for the generation of a configuration file which includes a predetermined proxy group assignment. A proxy group assignment may be a specific proxy server or a group of proxy servers; throughout this disclosure no distinction is intended between the assignment of a proxy group, a proxy server, or server. Upon receiving the proxy group assignment, the configuration server provides the information to the VoIP device. Subsequent calls from the VoIP device are governed by the configuration file, thus any call from the VoIP device begins with signaling to the assigned proxy server or proxy group to initiate call connection. This assignment of proxy group remains static whether or not the VoIP device is moved to another location, or if additional proxy resources are added to the VoIP network.

Figure 1:
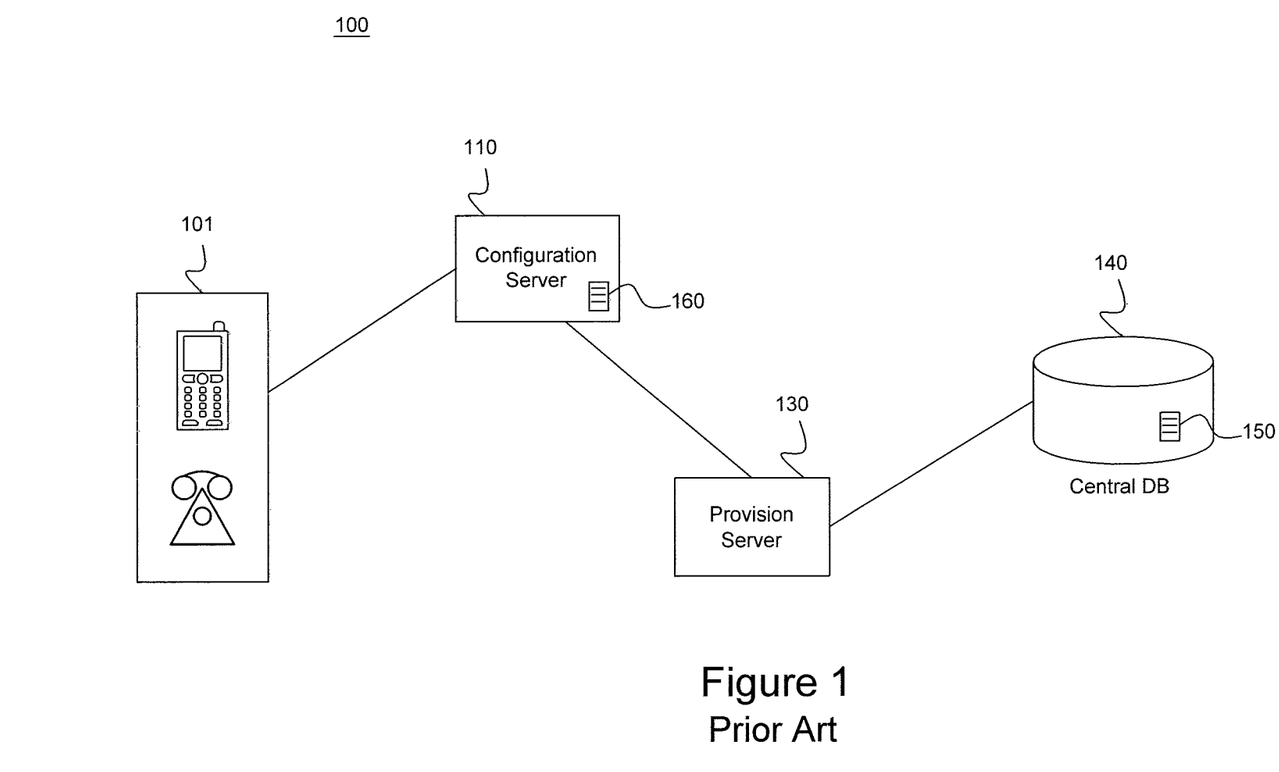
FIG. 1 is a block diagram of a portion of a prior art VoIP network capable of statically assigning proxy groups to subscriber equipment.

FIG. 1 illustrates a prior art VoIP system 100. A VoIP device 101 registers with a configuration server 110. A central Database 140 contains records 150 for determining the proxy group assignment for the VoIP device 101. These records 150 are used by a provisioning server 130 to generate a configuration file 160 which is provided by the configuration server 110 to the VoIP device 101. Accordingly, the network resources generate a configuration file 160 regardless of the actual location of the VoIP device 101.

Figure 2:
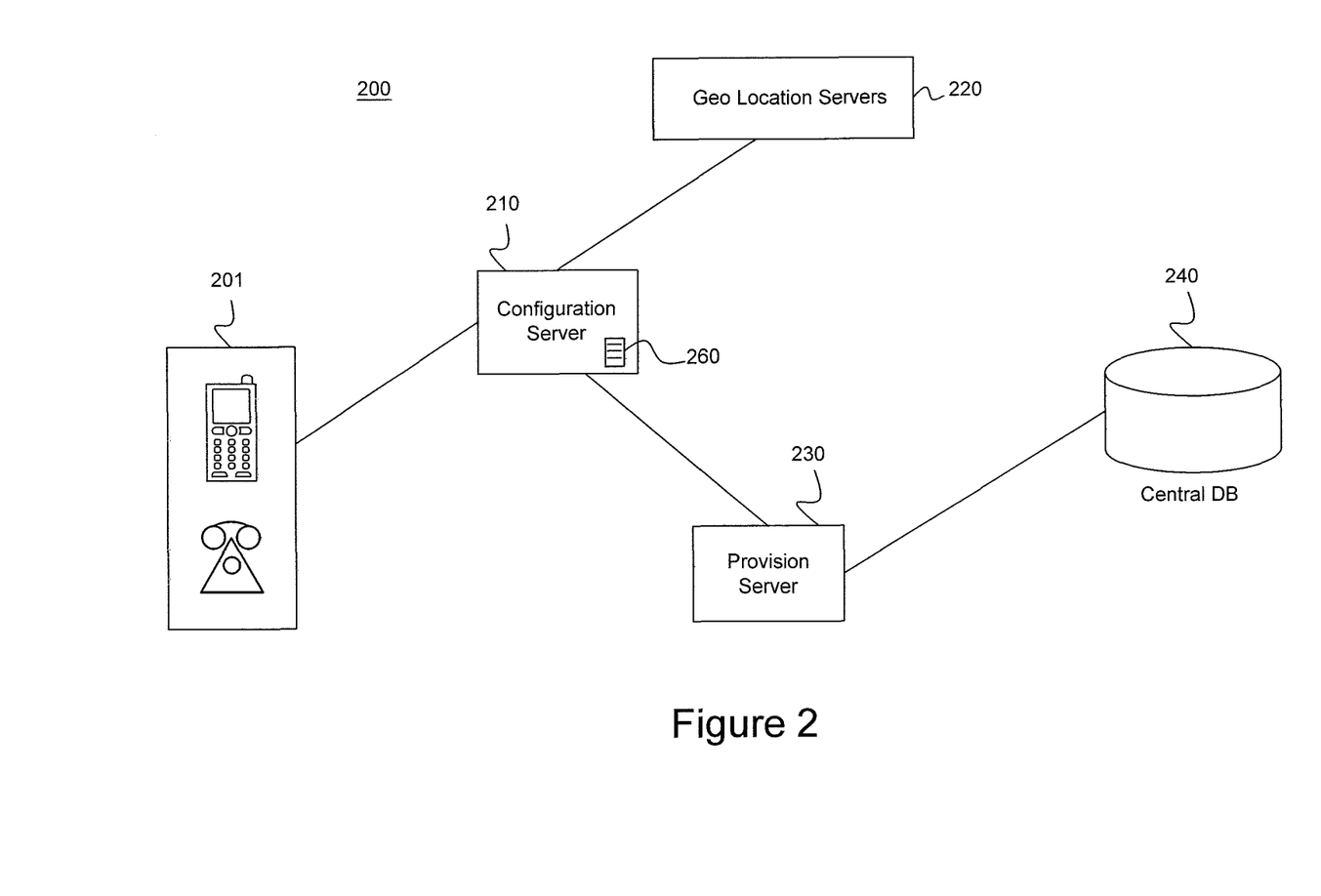
FIG. 2 is a block diagram of a portion of a VoIP network capable of dynamically assigning proxy groups to subscriber equipment in accordance with the current disclosure.

The disclosed subject matter employs a dynamic assignment of proxy groups by integrating geo-location system components and analysis steps to determine where the VoIP device is in physical relation to other network resources. The network resources that are closest in proximity and with capacity are assigned to the VoIP device 101. These network resources include the proxy server or proxy group that will be contacted to establish a communication set up request from the VoIP device 101. In determining location of the VoIP device 101, the IP address from which the VoIP device 101 registration originated may be correlated to a location. The IP address may be the IP address assigned to a modem associated with a residential Internet Customer or may be that of a NAT router or Wi-Fi device, within the customer's residential network or a commercial public network. The IP address from which the VoIP device 101 registers will have a correspondence with the actual location of the VoIP device and an IP address can be tracked to a relatively small geographical area. Other methodology for determining the location of the VoIP device may also be used, such as smart phones providing their geographic coordinates during registration, self-reported location provided by the user, or with reference to Home or Visiting location register associated with wireless telephone systems. This process of determining the geographic location of the VoIP device may be advantageously performed periodically, upon connection to the network or event driven. For example, when a VoIP device is powered on, connected to the network, changes origination IP address or self-reports a new location, location determination activity is triggered. The self-reporting may be accomplished by the user providing location information to a web site or other VoIP provider system, or may be self-reported by a smart phone providing an updated GPS or cellular system determined location directly to the VoIP provider in a periodic communication. The location information could be updated in the central database. Additionally, the configuration file may also be updated on these events or periodically.

FIG. 2 depicts a VoIP system 200 in accordance with one embodiment of the current disclosure. Specifically, a VoIP device 201 registers with a configuration Server 210; the configuration Server 210 queries a Geo-location server(s) 220 for the location of the VoIP device 201. The location of the device is used by the Provisioning server 230 to develop a configuration file 260, which includes assignment of a proxy group. Such configuration file 260 is provided through the configuration server 210 to the VoIP device 201. The location of the VoIP device is also stored in the central DB 240. The registration of the VoIP device 201 may occur periodically, upon connection to the internet, be triggered by a change in network topology, or in response to another event.

Figure 3:
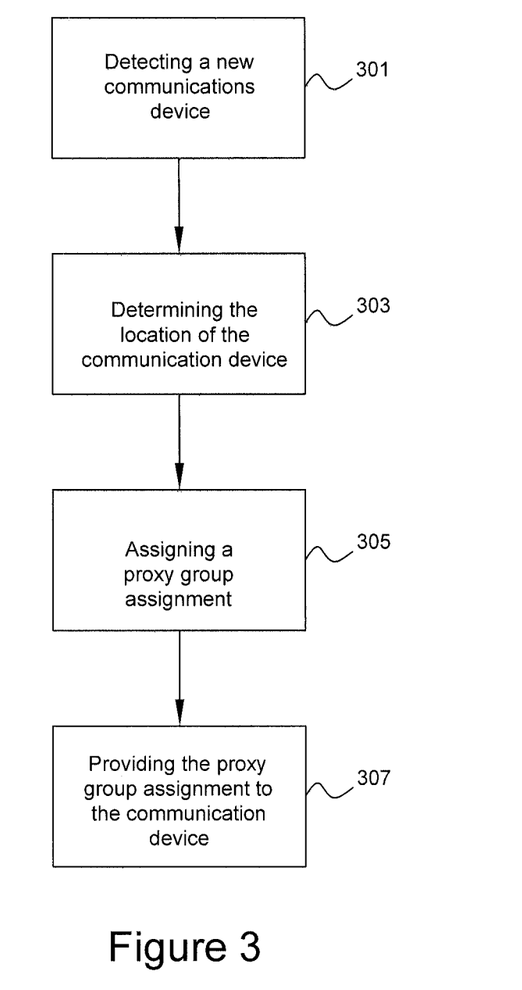
FIG. 3 is a flow chart depicting a method for dynamically assigning proxy groups in accordance with the current disclosure.

FIG. 3 depicts a method of dynamic proxy group assignment in accordance with the current disclosure. The method includes detecting a new communications device in Block 301. The detection of the new communication device may result from receiving a registration request, a polling response or other type of message from a VoIP device. A new communication device used within this description only infers a device that was previously not detected. Upon detection of the communication device, the location of the device is determined in Block 303. Using the location of the device and other parameters associated with VoIP network registration, a proxy group is assigned to the communication device in Block 305. The proxy group assignment is then provided to the communication device as shown in Block 307.

Since the VoIP system 200 of the current disclosure would have the location of the VoIP device 201, the configuration of the VoIP device 201 in addition to the assignment of the proxy server or proxy group could reflect local preferences or customs, such as ring tones, prompts and language. Geographic based features may be a default setting or may require user activation.

In an alternate embodiment of the disclosed subject matter, geographic information can be leveraged when the VoIP system 200 is determining resolution of an emergency call from VoIP devices. Using the IP address, from which the telephony device registers, or other geo-location determination method's intelligent routing decisions for 911 calls can be made to prevent calls from being connected to the wrong location. For example, if an emergency call is originating from an IP address corresponding to a location other than the customer's residential area or the self-reported location, the 911 call to the Emergency services facility associated with the customer's residential area could be blocked or alternatively, the call might be routed to an emergency services facility located near the location from which the call originated. This would prevent a user from needlessly tying up a 911 operator in an area not served by the operator and reduce costs by preventing the completion of ineffectual calls through the PSTN, which a VoIP provider must pay to accomplish.

Figure 4:
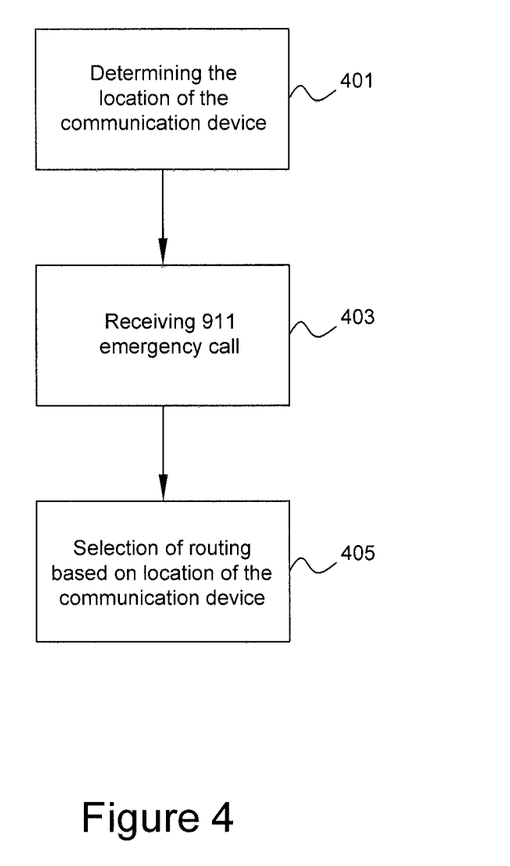
FIG. 4 is a flow chart depicting a method for handling an emergency call in accordance with the current disclosure.

FIG. 4 depicts a method for emergency call handling based on geographic registration information is accordance with the current disclosure. The location of a VoIP device is determined in Block 401. Upon receiving an emergency call as shown in Block 403, the network determines the routing of the emergency call based on the previously determined location of the VoIP device in Block 405.

Figure 5:
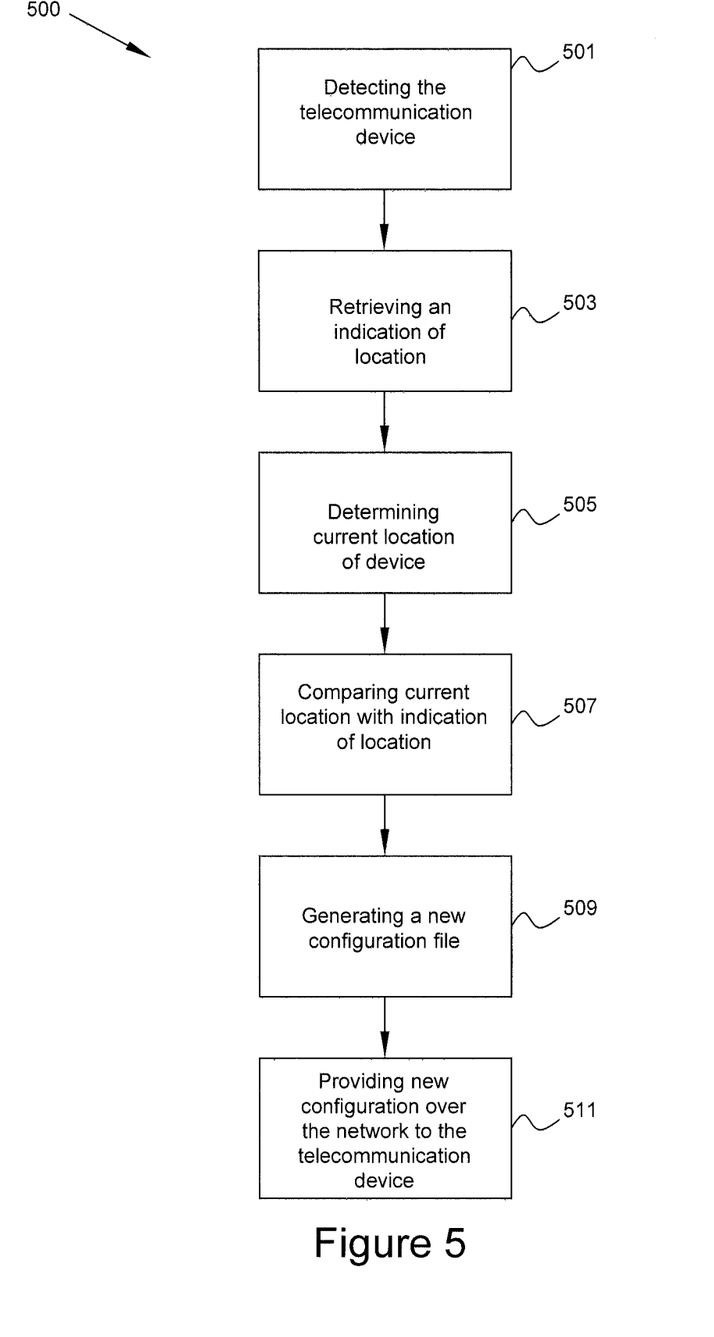
FIG. 5 is a flow chart depicting a method of dynamically configuring a telecommunication device in accordance with the current disclosure.

FIG. 5 shows a method for dynamically configuring a telecommunication device. The telecommunication device is detected as shown in Block 501. This step may be in response to the telecommunication device powering on, connecting to the network or initiating a call. The detection may be facilitated by a message transmitted from the telecommunication device, or other system notification. Upon detection of the telecommunication device the configuration file of the telecommunication device is accessed and an indication of the location of the device is retrieved as shown in Block 503. The indication of location may be the listed IP address of the telecommunication device, a listed geographic location, or the currently assigned server. In the case of an unidentified or un-configured device, a generic or null configuration file may be accessed and a default indication of location retrieved.

The current location or estimate of the current location of the telecommunication device is then determined as shown in Block 505. As described previously, the current location may be determined by a query to a geo-location server which correlates characteristics of the telecommunication device such as originating IP address with a geographic location. The current location may also be determined using information received from the telecommunication device itself, such as GPS coordinates, user defined location, network access connection point, etc.

The current location is then compared with the indication of location as shown in Block 507. If the comparison is favorable, (i.e. they are consistent) then no changes are applied to the configuration, however if they are not consistent or different, a new configuration file may be generated based on the comparison and the current location as shown in Block 509. The new configuration file may include assignment of a server based on the current location, may include an indication of the current location, a plurality of features such as dial tone, ring tone, operator assistance, caller ID, dial plan and language, all of which may be a function of the current location and associated culture or practice. The assignment of the server may be based on geographic distance, network topography, usage, QoS (quality of service) or combinations thereof. The new configuration is then provided to the telecommunication device over the network as shown in Block 511. The configuration provided to the telecommunication device need not be the same configuration file stored by the system, but rather reflects portions therein.

Additional aspects of the current disclosure include using as the query input to the geo-location server, the IP address of the telecommunication device or the network access connection. The telecommunication device may include terminal adapters for connection of a landline type telephone to the VoIP network or a mobile telephony device operating in a cellular or WiFi environment, additional VoIP devices such as personal computers, notebooks and portable computing devices are also envisioned as telecommunication devices for the purposes of this disclosure.

It is envisioned that the configuration file comprises one or more aspects that allow the telecommunication device to operate in accordance with telephony practices that are native to the telecommunications device's present physical location, not only to ensure proper operation but also instill comfort in the users of the telecommunication device. One aspect is providing a dial tone that is native to present location and another is providing a ring-back tone, ring tone or operator service that is native to present location. In addition a dial plan that mimics local practice, such as dialing within the local area without the necessity of using the area code.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of dynamic server assignment in a VoIP network comprising:
   detecting a telecommunication device on the VoIP network;
   querying a geo-location server for geographic information related to the telecommunication device's location and receiving the geographic information;
   determining a server assignment based on the geographic information received about telecommunication device's location;
   creating a configuration file for the telecommunication device, the configuration file including the device's location and server assignment; and,
   providing the configuration file over the VoIP network to the telecommunication device;
   wherein the configuration file further comprises characteristics of the telecommunication device, said characteristics selected in accordance with customs associated with the telecommunication device's location;
   wherein the characteristics of the communication device are selected from the group consisting of dial tone, ring tone, operator assistance, caller ID, dial plan and language.

2. A method of configuring a new telecommunication device on a VoIP network, comprising:
   connecting the new telecommunication device to a network via a network access point;
   sending a message from the new telecommunication device to a configuration server accessible on the network;
   receiving the message at the configuration server;
   querying a geo-location server for geographic information related to the new telecommunication device's location;
   receiving the geographic information from the geo-location server;
   determining a server assignment based on the new telecommunication device's location and location of a candidate server; and,
   creating a configuration file for the new telecommunication device including the device location and server assignment and providing the configuration file over the network to the telecommunication device.

3. The method of claim 2, wherein the message is sent to a predetermined address stored in the new telecommunication device.

4. A method of dynamically configuring a telecommunication device, comprising:
   detecting the telecommunication device;
   retrieving an indication of the location of the telecommunication devices from a configuration file associated with the telecommunication device;
   determining a current location of the telecommunication device;
   comparing the current location of the telecommunication device with the indication of the location;
   generating a new configuration for the telecommunication device based on the comparison and the current location; and,
   providing the new configuration via a network to the telecommunication device.

5. The method of claim 4, wherein the step of determining the current location comprises the step of querying a geo-location server.

6. The method of claim 4, wherein the step of determining the current location is based on information received from the telecommunication device.

7. The method of claim 4, wherein the step of determining the current location of the telecommunication device comprises determining an IP address of a network access point via which the telecommunication device is connected.

8. The method of claim 4, wherein the indication of location of the telecommunication device is a listed IP address.

9. The method of claim 4, wherein the indication of the location of the telecommunication device is a listed geographic location.

10. The method of claim 4, wherein the indication of the location of the telecommunication device is an assigned server.

11. The method of claim 4, wherein the new configuration comprises an assignment of a server based on the current location of the telecommunication device.

12. The method of claim 4, wherein the new configuration comprises an indication of the current location.

13. The method of claim 4, wherein the new configuration comprises a plurality of features based upon the current location.

14. The method of claim 13, wherein the features are selected from the group consisting of dial tone, ring tone operator assistance, caller ID, dial plan and language.

15. The method of claim 4, wherein the new configuration comprises an assignment of a 911 call center.

16. The method of claim 15, wherein a 911 call from the telecommunication device is routed to the assigned 911 call center.

17. The method of claim 4, wherein the telecommunication device is selected from the group consisting of a terminal adapter for connection of a landline type telephone to the VoIP network and a mobile telephony device operating in a cellular or WiFi environment.

18. The method of claim 5, wherein the query input to the geo-location server is the current IP address of the telecommunication device.

19. A method of dynamically configuring a telecommunication device, comprising:
   providing a configuration file for the telecommunications device, wherein the configuration file includes a first server assignment;
   receiving a message from the telecommunication device at the assigned first server;
   retrieving an indication of the location of the telecommunication devices from the configuration file associated with the telecommunication device;
   querying a geo-location server for geographic information related to the telecommunication device's location and receiving geographic information;
   comparing the geographic information related to the telecommunication device's location with the indication of the location from the configuration file;
   generating a new configuration for the telecommunication device based on the comparison and the geographic information; wherein the new configuration includes a second server assignment; and, providing the new configuration via a network to the telecommunication device.

* * * * *